(12) United States Patent
Facin et al.

(10) Patent No.: US 11,416,066 B2
(45) Date of Patent: *Aug. 16, 2022

(54) METHODS AND SYSTEMS FOR GENERATING AND PROVIDING IMMERSIVE 3D DISPLAYS

(71) Applicant: VERIZON PATENT AND LICENSING INC., Basking Ridge, NJ (US)

(72) Inventors: Sarah Facin, London (GB); Roy Rodenhauser, London (GB); Jonathan Delefortrie, London (GB); Andreas Jud, London (GB)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,887

(22) Filed: May 17, 2021

(65) Prior Publication Data

US 2021/0271314 A1 Sep. 2, 2021

Related U.S. Application Data

(63) Continuation of application No. 14/850,050, filed on Sep. 10, 2015, now Pat. No. 11,009,939.

(51) Int. Cl.
*G06F 3/01* (2006.01)
*G06F 3/04815* (2022.01)
*G06F 3/04883* (2022.01)

(52) U.S. Cl.
CPC .......... *G06F 3/011* (2013.01); *G06F 3/04815* (2013.01); *G06F 3/04883* (2013.01)

(58) Field of Classification Search
CPC . G06T 15/00; G06F 3/048; G06F 3/01; G06F 3/0488; G06F 3/04815

See application file for complete search history.

(56) References Cited

U.S. PATENT DOCUMENTS

| | | | |
|---|---|---|---|
| 7,683,883 | B2 | 3/2010 | Touma et al. |
| 9,412,203 | B1 | 8/2016 | Garcia, III et al. |
| 2005/0226483 | A1 | 10/2005 | Geiger et al. |
| 2006/0287058 | A1 | 12/2006 | Resnick et al. |
| 2007/0070066 | A1 | 3/2007 | Bakhash |
| 2009/0325607 | A1 | 12/2009 | Conway et al. |
| 2010/0169836 | A1 | 7/2010 | Stallings et al. |
| 2011/0124410 | A1 | 5/2011 | Mao et al. |
| 2012/0254790 | A1 | 10/2012 | Colombino et al. |

(Continued)

OTHER PUBLICATIONS

World of Warcraft in Oculus Rift 3D: Menus, https://www.youtube.com/watch?v=CpU7kusXC-k. Published on Jun. 4, 2013 by Youtube user MaruluExploit (2013).

(Continued)

*Primary Examiner* — Kyle M Lotfi (57) ABSTRACT

An immersive three-dimensional display with interactive content panels which is responsive to input from users' interactions is disclosed. A panoramic image is spherically mapped to a virtual three-dimensional space. Interactive content is configured with transparent images to form interactive content panels. The interactive content panels thus formed are positioned within the three-dimensional space to form the immersive 3D display with a background comprising the panoramic image. The immersive 3D display is transmitted to the client device for display to the user.

20 Claims, 9 Drawing Sheets

(56) References Cited

U.S. PATENT DOCUMENTS

2013/0249792 A1    9/2013   Carraro et al.
2013/0263280 A1   10/2013   Cote
2013/0346911 A1   12/2013   Sripada
2016/0219325 A1    7/2016   Chu et al.

OTHER PUBLICATIONS

"Multi-Touch Windows 7 Tablet—How to Play World of Warcraft with Touch Controls," posted on YouTube on Mar. 18, 2011 by BEASTthisindustry (2011).

METHODS AND SYSTEMS FOR GENERATING AND PROVIDING IMMERSIVE 3D DISPLAYS

CROSS REFERENCE TO RELATED APPLICATIONS

This application is a continuation of and claims priority from U.S. patent application Ser. No. 14/850,050, filed Sep. 10, 2015, issued as U.S. Pat. No. 11,009,939 on May 18, 2021, and entitled METHODS AND SYSTEMS FOR GENERATING AND PROVIDING IMMERSIVE 3D DISPLAYS, the contents of which are hereby incorporated by reference.

REFERENCE TO COMPUTER PROGRAM LISTING APPENDIX

The Computer Program Listing contained in file "US Appl. No. 17_321887 (085804-119501)—Computer Program Listing Appendix.txt" created as an ASCII Plain Text (.txt) document on Jun. 3, 2021 and with a size of 55 kb is hereby incorporated by reference in its entirety.

BACKGROUND

The proliferation of various types of electronic devices and data networks enable myriad ways of providing information and entertainment. These include large electronic devices such as televisions with screen sizes varying from 15 inches to more than 100 inches, midsized devices such as laptops and tablets, smaller devices like smartphones and wearable computing gear such as smartwatches and augmented reality (AR) glasses. Various types of content such as but not limited to text, audio, video and gaming content is provided to the users via these devices. This necessitates generating a single content piece in different content formats to suit the various kinds of devices.

SUMMARY

This disclosure relates to an immersive three-dimensional (3D) display with content panels providing interactive content. The immersive 3D display is configured to shift or alter in response to user interactions with a device showing the display on its screen. A panoramic image is spherically mapped to a virtual three-dimensional space. Interactive content is configured with transparent images to form interactive content panels. The interactive content panels thus formed are positioned within the three-dimensional space to form the immersive 3D display with a background comprising the panoramic image. The immersive 3D display is transmitted to the client device for display to the user. As the immersive 3D display shifts in response to the user interactions, it is thus configured for providing content which is not limited by the screen sizes of the various devices but instead visually provides the ability for the viewer to see into the virtual three-dimensional space using the device screen as a virtual viewing window into the space or within the space.

A method of displaying interactive, immersive 3D displays is disclosed in accordance with some embodiments. The method comprises, displaying, by a processor of a computing device, an immersive display comprising a background panoramic image spherically mapped to conform to a virtual three-dimensional space. The virtual three-dimensional (3D) space further comprises at least one visible interactive content layer displayed at a respective position within the virtual 3D space and the virtual 3D space is viewed from an initial point of view by a user. The method further comprises receiving, by the processor, an input indicative of a user interaction with the device and panning, by the processor, the display in accordance with the user action. The panned display shows a changed point of view within the panoramic background image wherein the point of view changes corresponding to the user interaction. The method further comprises receiving, by the processor, user interaction with the interactive content layer and providing, by the processor, interactive content to the user based on the user interaction with the interactive content layer.

In some embodiments, the immersive display is displayed on a touchscreen of a mobile computing device, and receiving the input indicative of the user interaction further comprises receiving, by the processor of the mobile computing device, the input from a motion sensor of the mobile computing device, the motion sensor input being indicative of an angular displacement of the mobile computing device. In some embodiments, receiving the input indicative of the user action further comprises receiving, by the processor of the mobile computing device, the input from the touchscreen, wherein the touchscreen input is indicative of a swipe action from the user. In some embodiments, receiving the input indicative of the user action further comprises receiving, by the processor, the input indicative of the user action from a user input device, the user input device input being indicative of a selection action from the user.

In some embodiments, displaying, by the processor, an immersive display comprising a background panoramic image further comprises displaying the immersive display comprising the background panoramic image spherically mapped to a cube, wherein the virtual three-dimensional object is configured as the cube. In some embodiments, displaying at least one interactive content layer further comprises displaying, by the processor, a respective interactive content layer on each of a plurality of surfaces of the cube. In some embodiments, displaying respective interactive content layer further comprises, displaying, by the processor an interactive video player on a first one of the plurality of surfaces, a photo gallery on a second one of the plurality of surfaces and displaying, links to social networking resources on a third one of the surfaces. In some embodiments, the method of displaying the at least one surface with an interactive content layer, further comprises displaying, a transparent interactive content layer such that interactive content comprised in the interactive content layer is displayed as an overlay on the background panoramic image. In some embodiments, the immersive 3D display and the interactive content panel correspond to a central theme.

An apparatus comprising a processor and a storage medium for tangibly storing thereon immersive 3D display generating program logic for execution by the processor is disclosed in some embodiments. The program logic further comprises displaying logic that displays an immersive display comprising a background panoramic image spherically mapped to conform to a virtual three-dimensional space. The virtual three-dimensional (3D) space further comprises at least one visible interactive content layer displayed at a respective position within the virtual 3D space wherein the virtual 3D space is viewed from an initial point of view. The program logic further comprises input receiving logic that receives an input indicative of a user interaction with the device, panning logic that pans the display in accordance with the user action, the panned display displaying a changed point of view within the panoramic background image, wherein the point of view changes corresponding to the user interaction, interaction receiving logic that receives a user interaction with the interactive content layer and content providing logic that provides an interactive content to the user based on the user interaction with the interactive content layer.

In some embodiments, the apparatus is a mobile computing device and the displaying logic further comprises logic that displays the immersive display on a touchscreen of the mobile computing device. The input receiving logic that receives the input indicative of the user interaction further comprises sensor input receiving logic that receives the input from a motion sensor of the mobile computing device, the motion sensor input being indicative of an angular displacement of the mobile computing device. The input receiving logic that receives the input indicative of the user interaction further comprises touchscreen input receiving logic that receives the input from the touchscreen, the touchscreen input being indicative of a swipe action from the user. In some embodiments, the background panoramic image is spherically mapped to the virtual three-dimensional object being configured as the cube and the displaying logic further comprises logic for displaying a respective interactive content layer on each of a plurality of surfaces of the cube. The content providing logic further comprises, logic that displays an interactive video player on a first one of the plurality of surfaces, logic that displays a photo gallery on a second one of the plurality of surfaces and logic that displays links to social networking resources on a third one of the surfaces.

A non-transitory computer readable storage medium comprising processor-executable instructions for generating immersive, interactive 3D displays is disclosed in an embodiment. The processor-executable instructions comprise instructions that display an immersive display comprising a background panoramic image spherically mapped with a virtual three-dimensional space. The virtual three-dimensional (3D) space further comprises at least one visible interactive content layer displayed at a respective position within the virtual 3D space and viewed from an initial point of view. The instructions further comprise instructions that receive an input indicative of a user interaction with the device and pan the display in accordance with the user action. The panned display displays a changed point of view within the panoramic background image, wherein the point of view changes corresponding to the user interaction. The instructions also comprise instructions that receive user interaction with the interactive content layer and provide interactive content to the user based on the user interaction. In some embodiments, the non-transitory computer readable storage medium further comprises instructions that display the immersive display comprising the background panoramic image spherically mapped to a cube and instructions that display a respective interactive content layer on each of a plurality of surfaces of the cube.

A method for creating an interactive, immersive 3D display is disclosed in some embodiments. The method comprises receiving, by a processor, a panoramic image and at least one interactive content item for an immersive 3D display, mapping, by the processor, the panoramic image to a virtual 3D space conforming to a geometric structure and generating, by the processor, interactive content panels corresponding to the at least one interactive content item. The method further comprises positioning, by the processor, the interactive content panels within the virtual 3D space, configuring, by the processor, the geometric structure to be responsive to user interaction data that comprises sensor data of a device displaying the immersive 3D display and transmitting, by the processor, the immersive 3D display to a client device for display.

In some embodiments, the method for mapping the panoramic image further comprises, spherically mapping, by the processor, the panoramic image to the virtual 3D space. In some embodiments, the method for generating the interactive content panels further comprises configuring, by the processor, at least one transparent image to comprise the interactive content. In some embodiments, the geometric structure is a cube and positioning the interactive content panels further comprises overlaying, by the processor, the interactive content panels on at least one side of the cube.

In some embodiments, transmitting immersive the 3D display to a client device further comprises configuring, by the processor, a webpage with the immersive 3D display and transmitting, by the processor, the webpage to the client device. In some embodiments, transmitting immersive the 3D display to a client device further comprises configuring, by the processor, an application with the immersive 3D display as a user interface and transmitting, by the processor, the application to the client device.

An apparatus comprising a processor and non-transitory computer readable storage medium comprising processor-executable program logic for creating an immersive 3D display is disclosed. The processor-executable program logic comprises receiving logic that receives assets for generating an immersive 3D display, mapping logic that maps the panoramic image to a virtual 3D space conforming to a geometric structure, generating logic that generates interactive content panels corresponding to the interactive content. In some embodiments, the apparatus further comprises positioning logic that positions the interactive content panels within the virtual 3D space, configuring logic for configuring the immersive 3D display to be responsive to user interaction input and transmitting logic, executed by the processor, that transmits the immersive 3D display to the client device. In some embodiments the geometric structure is a cube and the positioning logic further comprises logic executed by the processor for positioning the interactive content panels on at least one wall of a cube, the geometric structure being a cube.

A non-transitory computer readable storage medium comprising processor-executable instructions for receiving a panoramic image and at least one interactive content item for an immersive 3D display, mapping the panoramic image to a virtual 3D space conforming to a geometric structure and generating interactive content panels corresponding to the at least one interactive content item. The non-transitory medium further comprises instructions for positioning the interactive content panels within the virtual 3D space, configuring the geometric structure to be responsive to user interaction data that comprises sensor data of a device displaying the immersive 3D display and transmitting the immersive 3D display to a client device for display. In some embodiments, the non-transitory computer readable storage medium comprising processor executable instructions for configuring at least one transparent image to comprise the interactive content.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Users employ myriad computing and communication devices to access content for information and entertainment. The devices vary in size from large-screen televisions tethered to the networks via cables and antennas to small wearable devices that are connected to the content sources via wireless networks. Moreover, emergence of sophisticated hardware such as 3D viewing devices and/or AR/VR devices provide more immersive experiences to users while they interact with the content viewed on these devices. Providing such immersive experiences requires providing content in different formats to suit the various kinds of hardware that users employ to experience the content. Thus, content which is formatted to suite a desktop or a laptop screen may need to be re-configured to fit the smaller screen size of a tablet device, a smartphone or a smartwatch. Embodiments disclosed herein enable providing a more immersive experience to users consuming content without being constrained by the screen sizes of the computing devices.

Figure 1:
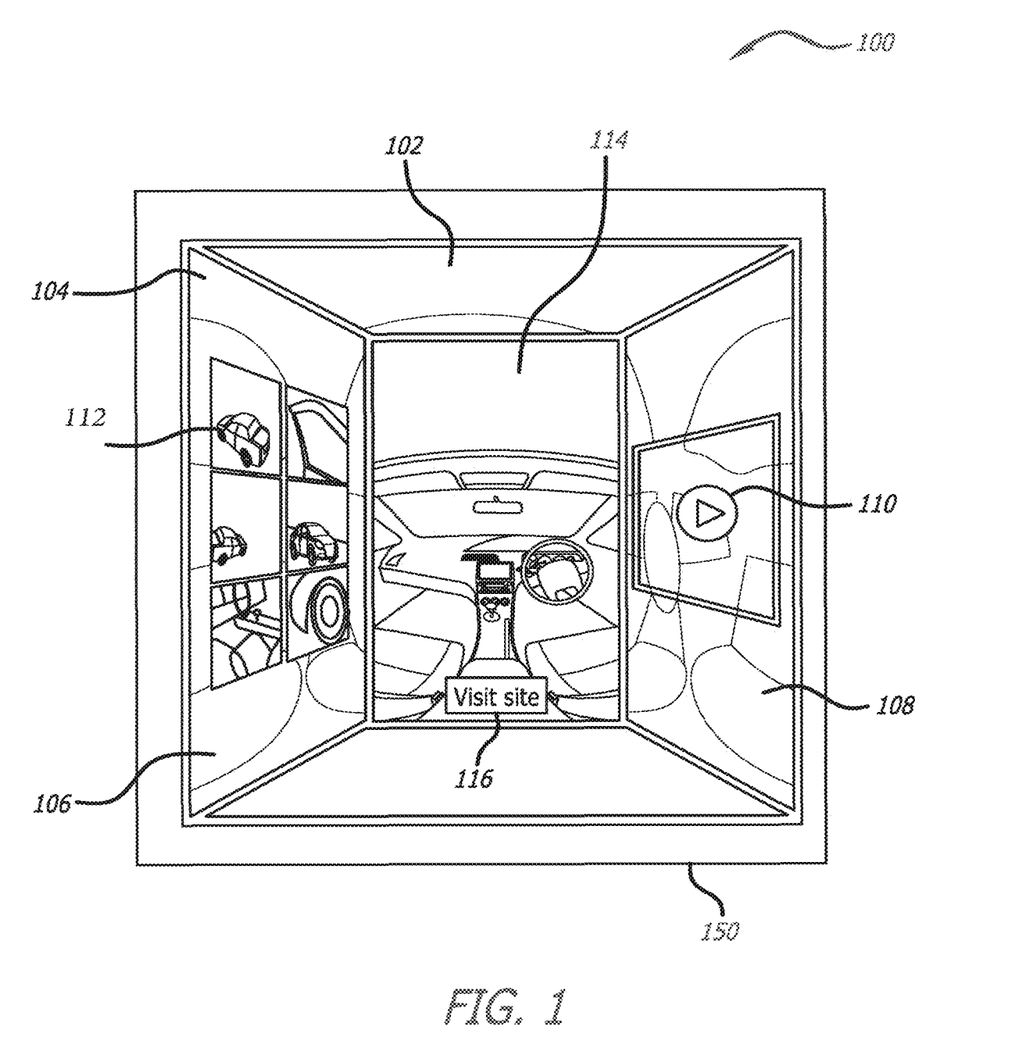
FIG. 1 is a schematic diagram showing an immersive 3D (three-dimensional) display generated by the computing device in accordance with some embodiments described herein.

FIG. 1 is a schematic diagram showing an immersive 3D (three-dimensional) display 100 generated by the computing device 150 in accordance with some embodiments described herein. By the way of illustration and not limitation, the computing device 150 can be a smartphone, a tablet computer, a laptop, a desktop, a wearable computing device and the like. The display 100 comprises a background panoramic image 102 mapped to a virtual three dimensional space 104. In FIG. 1, the virtual three dimensional space 104 to which the background panoramic image is shaped as a cube. It can be appreciated that the background panoramic image 102 can be mapped to a virtual three-dimensional space of other shapes in accordance with some embodiments such as rectangular prisms, spheres, conic sections or other volume-enclosing (fully or partially) shape. The virtual three-dimensional space 104 additionally comprises one or more interactive content layers 106, 108, 114 that comprise interactive content such as, a photo gallery 112 as shown on the layer 106 and a video player 110 as shown on the layer 108 and a link to a website as shown at 116. Other interactive content such as but not limited to games, links to social networking resources, animated images and the like can be included in the interactive content panels 106, 108 and 114. In some embodiments, the interactive content panels are included only on the vertical sides of the cubic three-dimensional space 104, but they can appear on any of one or more of the layers. In the case of spheres for example the content layers can extend around some or all of the virtual spherical surface in differing angular orientations and positions.

The panoramic background image 102 and the interactive content 110, 112 and 116 can be associated with a central theme so that the display provides the user with an overall immersive experience. For example, the immersive display 100 shown in FIG. 1 is an advertisement for a car that can be included on a webpage or provided in a native app on a smartphone or tablet device. Movement of the device is sensed by internal motion sensors, or movement on or across a touch screen, or movement of a cursor, such motion or touch data is interpreted to cause a user's point of view to responsively change. The seamless gyro/swipe navigation provides an intuitive "look around" experience within a seemingly enclosed environment such as the car interior formed by the six sides arranged into the cube. In some embodiments, the immersive display 100 can be provided as a user interface for a native app such as a video game. In some embodiments, the panoramic background image and the interactive content together can be related to a movie wherein the users can watch the movie or obtain other interactive content from the panels included in the display. Including content related to a central theme with a uniform 'look and feel' within the display 100 provides a more immersive experience to the users.

In some embodiments, the three-dimensional immersive display 100 is configured to be responsive to user interactions with the device 150. The input regarding the user interactions with the device 150 can be received from its various input components. For example, the immersive display 100 can be responsive to the users' touch input such as a swipe or a tap on the touchscreen of the device 150. Based on the instructions included in its code modules, the immersive display 100 can be programmed to shift to another portion of the image not currently in the user's view or provide interactive content. The panned display shows a point of view within the panoramic background image 102. The point of view changes corresponding to the user interaction such as the swipe navigation.

In some embodiments, the immersive display 100 can be responsive to a user moving or tilting the device 150. The input regarding such user interaction can be obtained from the position and/or motion sensors included in the device 150. The position/motion sensors such as the gyroscope, accelerometer and the like are configured to emit their data which can be received and processed by the modules of the immersive display 100. The immersive display 100 can thus be programmed to shift from a current view to show content that is not currently in the user's view. For example, a user's interaction such as shifting the device 150 or tilting the device 150 or otherwise displacing it upwards can cause the display 100 to shift upwards in the direction of displacement to show portion of the panoramic image that is above what is currently viewed by the user, simulating the user looking up into the image. Similarly, displacing the device 150 sideways can cause the display to move so that the image shifts in the direction of the displacement and a portion of the panoramic image lying outside of the edge opposite to the user's displacement direction becomes visible. This enables designers of webpages, online advertisements, video players, video games or other user interfaces to overcome the limitations imposed by the limited screen sizes of mobile devices by expanding the viewing area beyond the mobile device screens. Moreover, the spherical mapping of the panoramic image 102 to the virtual three-dimensional space 104 provides the user with a 3D effect on a computing device screen without the need for separate hardware such as the 3D glasses.

Figure 2:
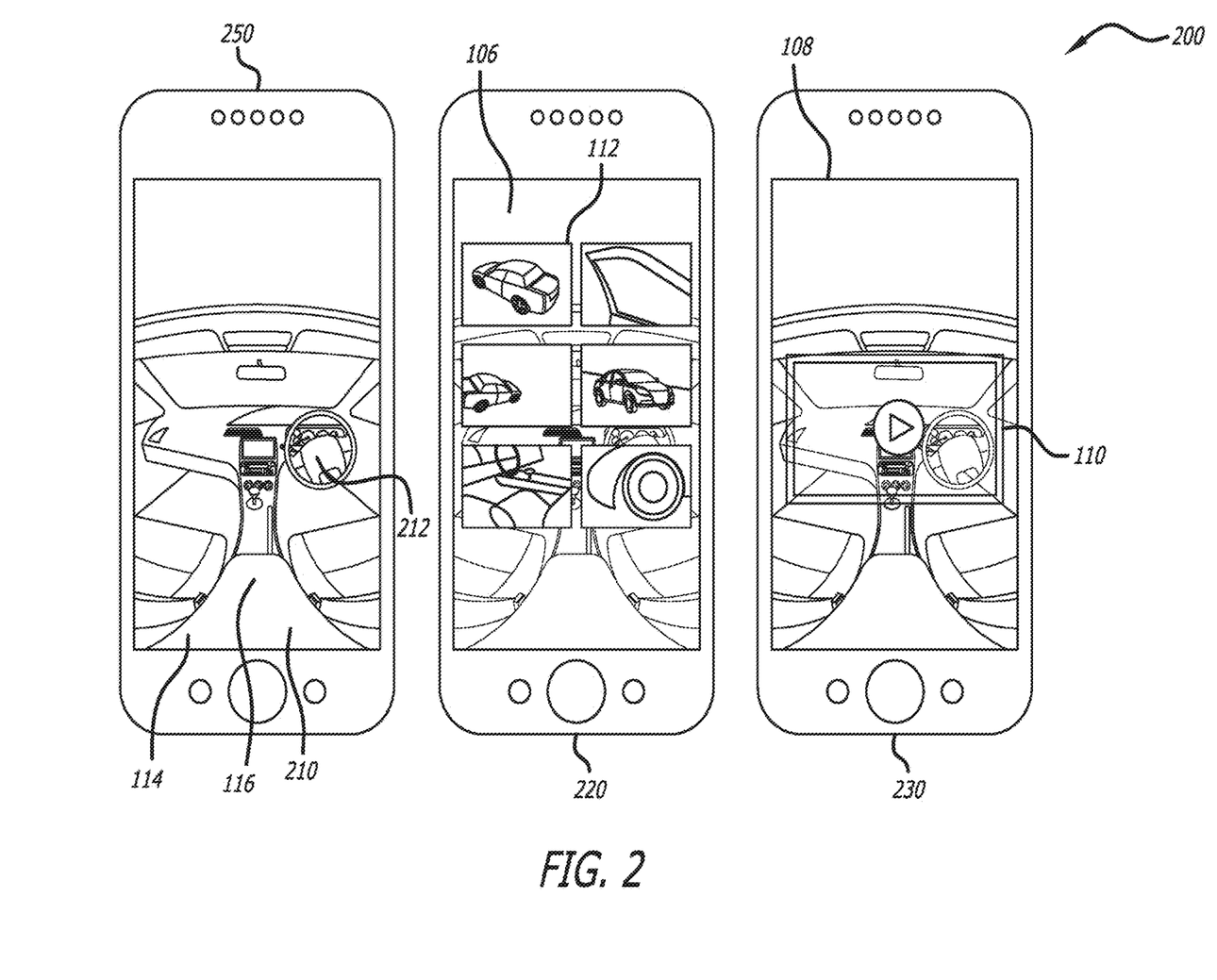
FIG. 2 is a schematic diagram illustrating the various interactive content panels comprised in the immersive 3D display as shown on a smartphone in accordance with some embodiments.

FIG. 2 is a schematic diagram 200 illustrating the various interactive content panels comprised in the immersive 3D display 100 as shown on a smartphone 250 in accordance with some embodiments. At 210, the content panel 114 is selected for interaction by the user. For example, a user can tap on the content panel 114 in the immersive 3D display 100 to bring the panel into further focus as shown at 210. The interactive content in this case comprises a link 116 to a website that provides further information regarding the car. In some embodiments, a plurality of interactive content elements can be provided on an interactive content panel. By the way of illustration and not limitation, the interactive content panel 114 can include a "gleam" 212 which invites a user to click or tap to obtain further information regarding the underlying element such as the steering system of the car. At 220, a display showing the photo gallery 112 is generated when a user selects to view the content panel 106. In some embodiments, the photos in the photo gallery 112 can be individually selectable for a more detailed view and can be available for download by a user to the smartphone 250. At 230, a display with the video player 110 is generated when the user selects to view the content panel 108. The user can further employ the user interface elements included in the video player to view a video associated with the car advertisement in the immersive 3D display 100. In some embodiments, a plurality of interactive content panels can be overlaid at a particular location within the 3D space 104 so that multiple interactive content elements are accessible to the users at a single location.

Figure 3:
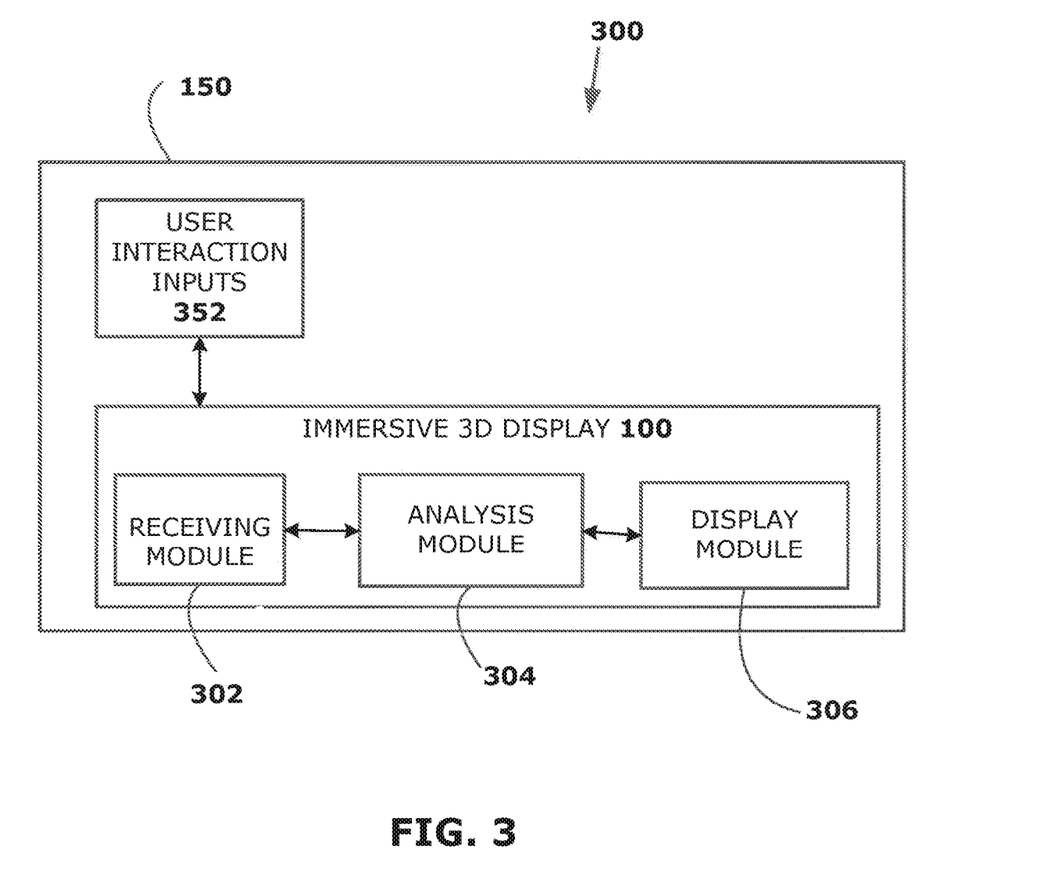
FIG. 3 is a schematic diagram of the various modules included in the immersive 3D display in accordance with some embodiments.

FIG. 3 is a schematic diagram 300 of the various modules included in the immersive 3D display 100 in accordance with some embodiments. The immersive 3D display 100 can be built using one or more of but not limited to, markup languages such as HTML, CSS (Cascading Style Sheets) and scripting languages such as javascript and the like. In some embodiments, the immersive 3D display can be part of a webpage. The immersive 3D display 100 is configured to be responsive to user interactions with the computing device 150 generating the display 100. In some embodiments, the immersive 3D display comprises a receiving module 302, a display module 304 and a manipulation module 306.

The receiving module 302 is configured to receive inputs 352 associated with user interactions from the various user input elements of the computing device 150. Based on the type of the computing device that presents the immersive 3D display 100, the user interaction information 352 can comprise raw sensor data from one or more of a touchscreen of the device 150, its position and motion sensor elements such as gyroscopes, magnetometers, accelerometers and the like or inputs from elements such as a keyboard and mouse to determine a user's interaction with the device 150. The analysis module 304 processes the user interaction information 352 to determine the attributes of the user interaction such as but not limited to the location, the direction and the trajectory or combinations thereof. For a touchscreen interaction, the location and direction of the user's swipe motion is determined. If the user provides input via displacement of the device 150, the user interaction inputs 352 from the position/motion sensors can provide the magnitude and the direction of the displacement.

Based on the user interaction inputs 352, the display module 306 manipulates the 3D immersive display 100 to be responsive to the user interactions. As the user swipes across the screen, the display 100 can be moved in the direction of the user's swipe so that a portion of the display 100 that is currently viewable on the touchscreen is altered to show other portions that were currently not viewable. Accordingly, any interactive content panels which were initially lying out of the screen area of the device 150 become accessible to the user. The viewable area of the device therefore acts as a window for the user to view portions of the panoramic background image 102.

Figure 4:
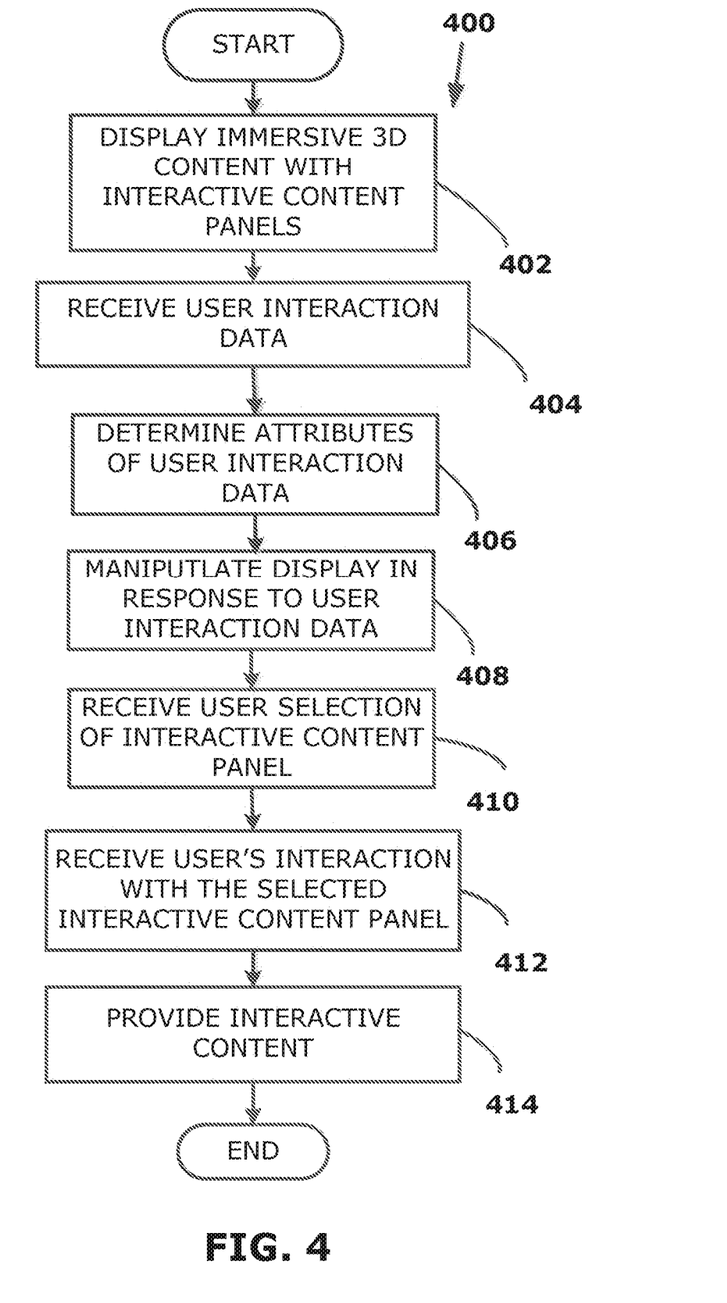
FIG. 4 is a flowchart that details a method of providing immersive, interactive 3D displays in accordance with some embodiments.

FIG. 4 is a flowchart 400 that details a method of providing immersive, interactive 3D displays in accordance with some embodiments. The method starts at 402 wherein a client device 150 displays the immersive, interactive 3D display 100. The display 100 can be provided as a part of a larger webpage for example, as an interactive ad unit, or the display 100 can be provided as a native app on a mobile device. The display 100 comprises the background panoramic image 102 mapped with a virtual three-dimensional space 104 comprising one or more visible interactive content layers displayed at different positions within the virtual three-dimensional space 104. At 404, the inputs 352 arising from a use's interaction with the device 150 are received. As mentioned supra, a user can interact with the device 150 by providing inputs through a touchscreen or via displacing the device 150 or via a keyboard and a mouse. Raw data from the touchscreen or the position/motion sensors of the device 150 is analyzed to determine the attributes such as but not limited to, the location, magnitude and trajectory of the user's interaction at 406. Based on the user interaction attributes, the display is manipulated or altered at 408. In some embodiments, the 3D display can comprise a plurality of interactive content panels 106, 108, 114 and the like. Accordingly, the display can be altered at 410 to show one or more of the interactive content panels. At 412, user interaction with one or more of the interactive content panels is received. The user can choose to access a website or link to further information, a photo gallery, view a video, play a game or access social networking resources, share content via the social networks and the like. The interactive content is provided to the user at 414 based on the user's interaction with the interactive content panels.

Figure 5:
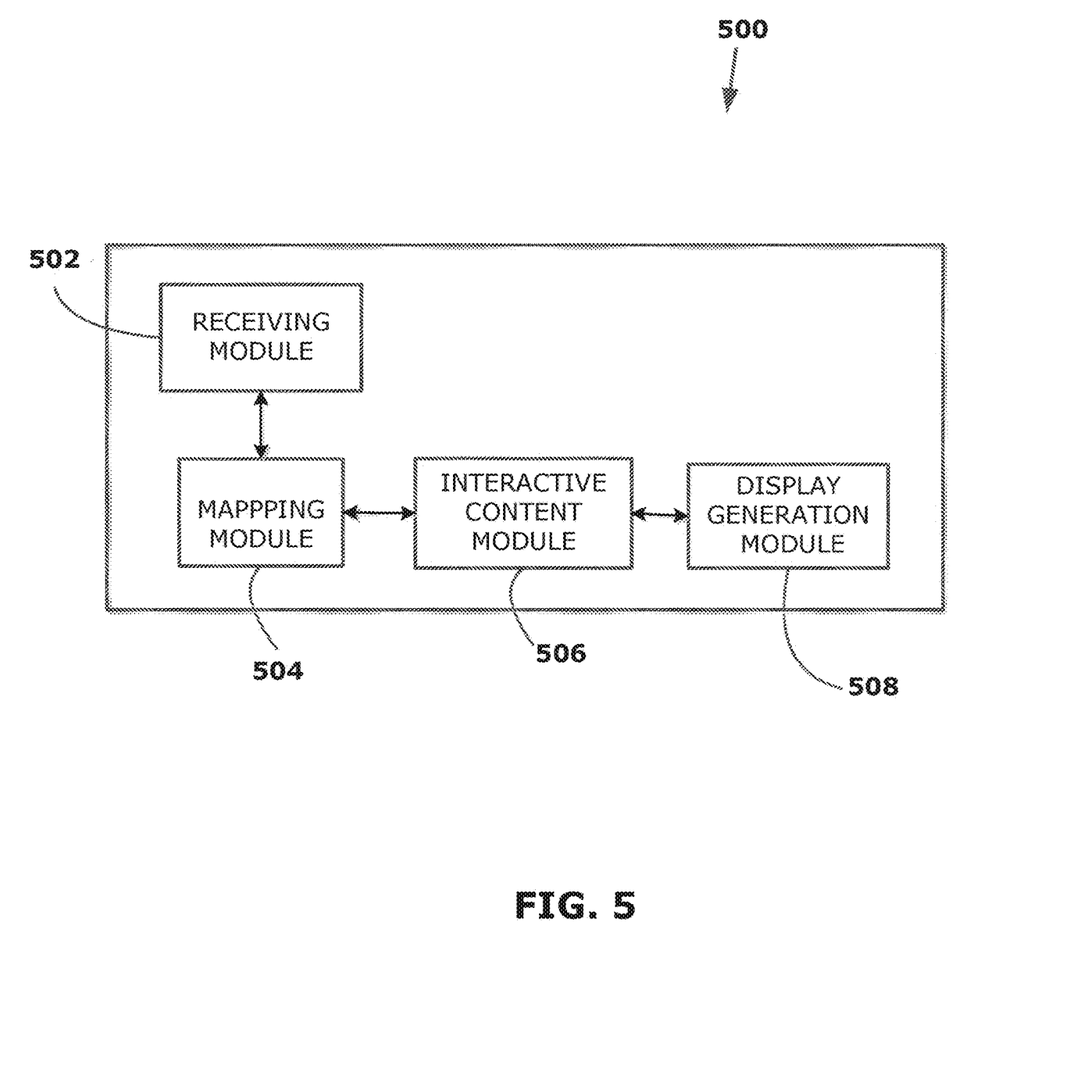
FIG. 5 is a schematic diagram of an immersive 3D display generator module for generating and transmitting 3D immersive content in accordance with some embodiments.

FIG. 5 is a schematic diagram of an immersive 3D display generator module 500 for generating and transmitting 3D immersive content in accordance with some embodiments. A computing apparatus comprising a central processor and non-transitory processor-readable storage medium can be configured to execute the instructions comprised in the various modules of the immersive 3D display generator module 500. A receiving module 502 receives the assets necessary to generate the immersive 3D display 100. The assets can comprise at least a panoramic wallpaper to be used as a background image 102 and content to be used for the interactive content panels. For example, if an advertisement was being developed in the immersive 3D display format in accordance with embodiments described herein, then the assets for the immersive 3D display can be provided by the entity commissioning the advertisement. The assets thus obtained are uploaded to a computing apparatus executing the immersive 3D display generator module 500 via the receiving module 502. In some embodiments, a 1600×1200 panoramic wallpaper in .PSD (Photoshop Document) file format can be used as the background image 102 for the immersive 3D display. In some embodiments, the receiving module 502 further receives the content to be included in the interactive content panels 106, 108 and 114. The content can comprise without limitation, photos for a photo gallery, a video, text content, links to websites or particular social networking resources, widgets that enable sharing particular content pieces of the immersive 3D display and the like.

The mapping module 504 can comprise programming instructions that enable sphere mapping of the background panoramic image 102 to a virtual three-dimensional space 104. Sphere mapping is a type of reflection mapping that approximates reflective surfaces by considering the environment to be an infinitely far-away spherical wall. Known graphics tools can be used for the spherical mapping in accordance with embodiments described herein. In some embodiments, the virtual three-dimensional space 104 can be a cube whose sides can be configured to receive the interactive content panels. The three-dimensional space 104 can form shapes other than a cube in accordance with some embodiments.

The interactive content module 506 comprises instructions to generate the interactive content panels using the content obtained by the receiving module. The interactive content panels can be configured for example, as 512×512 transparent PNG (Portable Network Graphics) images with the content embedded therein. By the way of illustration and not limitation, the interactive content panels can comprise content such as a photo gallery, a video, links to further information corresponding to the underlying background image embedded in a transparent image and the like. Various techniques known in HTML, javascript or other markup and scripting languages for embedding content on images or image/graphics editing tools currently know or to be invented can be used to generate the interactive content panels in accordance with embodiments described herein. In some embodiments, interactive content panels 106, 108 and 114 can be pre-made and supplied to the computing apparatus 500 via the receiving module 502.

The display generation module 508 combines the spherically mapped panoramic image with the interactive content panels to generate the immersive 3D display 100. In some embodiments, a combination of CSS (cascading style sheets) and javascript can be used to generate the immersive display with the interactive content. The display generation module 508 can also configure one or more of a webpage or a standalone application to include the immersive 3D display 100. When transmitted to a client device as part of a webpage or separately as a user interface for a stand-alone app, the immersive 3D display 100 in accordance with embodiments described herein can be executed by a browser therein or by the stand-alone app to provide interactive content to the user.

Figure 6:
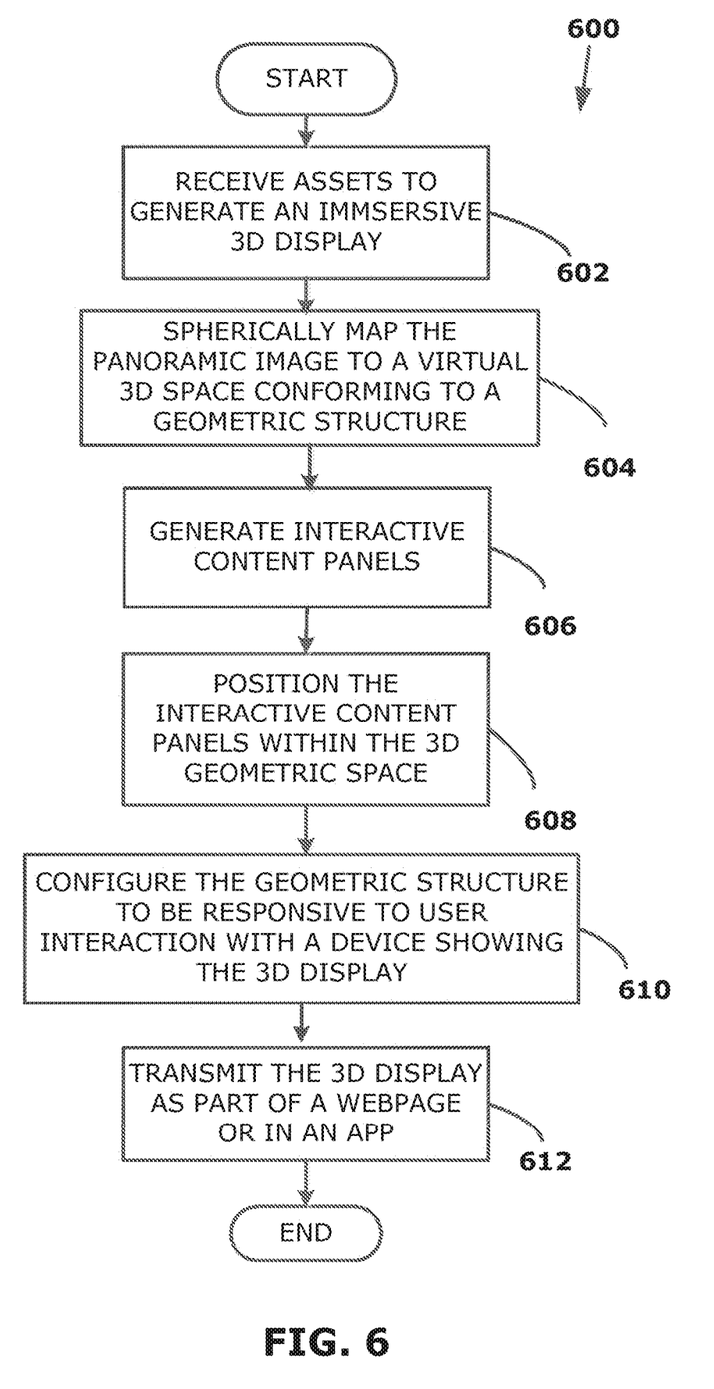
FIG. 6 is a flowchart that details a method of generating immersive 3D displays in accordance with embodiments described herein.

FIG. 6 is a flowchart 600 that details a method of generating immersive 3D displays in accordance with embodiments described herein. The method begins at 602 wherein the assets for generating an immersive 3D display are received. The assets can comprise a panoramic background image and content for the interactive content panels. At 604, the panoramic image is spherically mapped to a virtual 3D space that can describe a geometric structure. In some embodiments, the virtual 3D space describes a cube and hence, the panoramic image 102 is spherically mapped to a cube in accordance with some embodiments. The received interactive content 606 is used to generate the interactive content panels at 606. As described herein, transparent image panels can be configured with the interactive content comprised therein. The interactive content items can include but are not limited to individually selectable images forming an image gallery, or with a video player playing a video, embedded links or games, social networking resources and the like. At 608 the interactive content panels are positioned within the virtual 3D space. If the virtual 3D space conforms to a cubic structure, the transparent interactive content panels are overlaid on the sides of the cube. As the interactive panels are transparent, overlaying the interactive content panels on the sides of the cube allows the interactive content to appear as if it were embedded in the panoramic background image. In some embodiments, a single content panel can be overlaid on each of the walls of the cube. In some embodiments, a plurality of the interactive content panels can be overlaid on a single wall of the cube.

At 610, the immersive 3D display 100 is configured to be responsive to the user interaction with a computing device 150 showing the 3D display 100. In some embodiments, the 3D display can comprise code that receives interaction information from the various components/sensors of the device 150 and manipulates the 3D display 100 accordingly. The immersive 3D display thus generated is transmitted to a client device at 612. By the way of illustration and not limitation, the 3D display can be incorporated within a webpage and transmitted to the client device or the 3D display can be part of an application or a stand-alone application executed by the client device.

Figure 7:
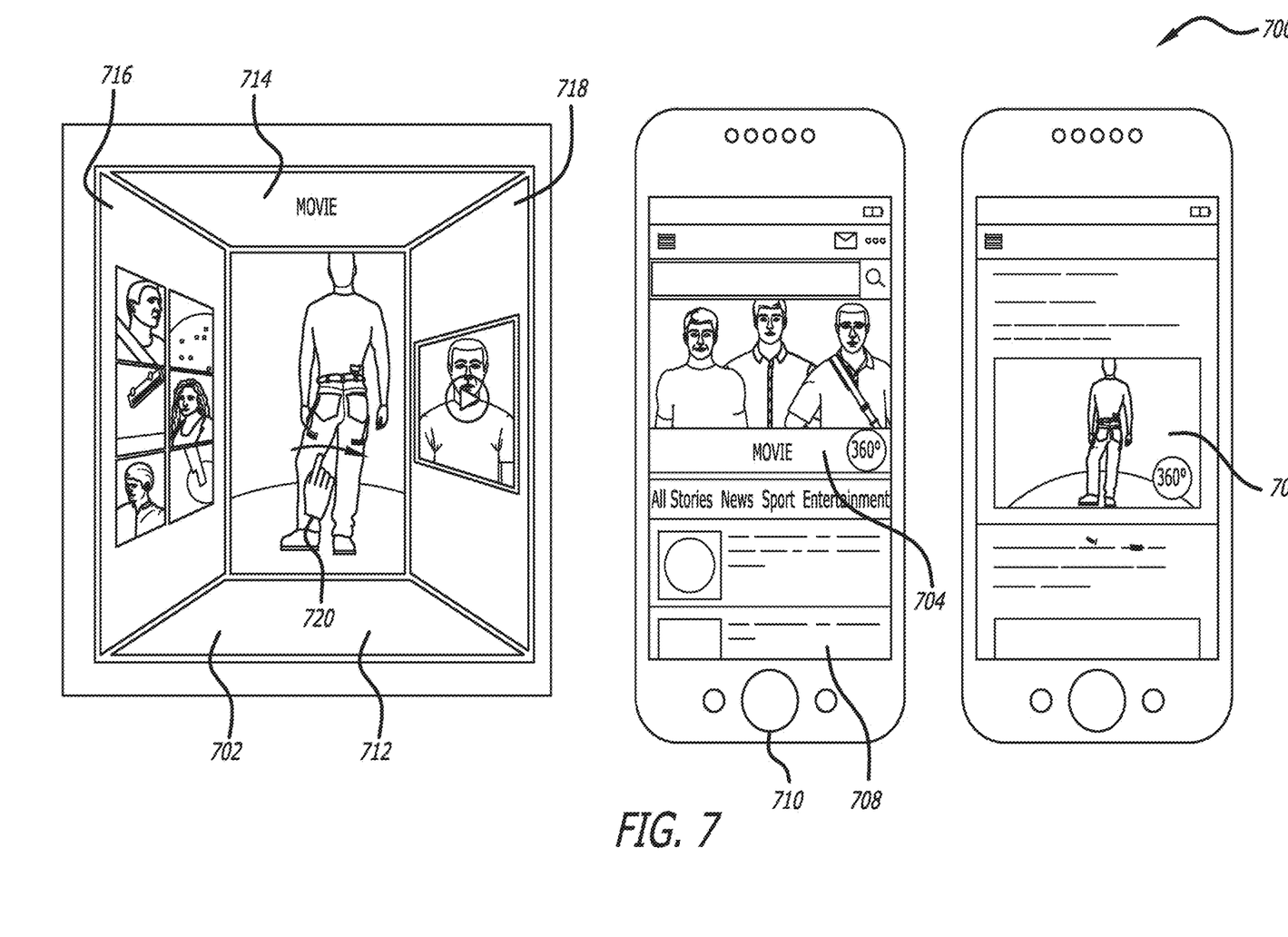
FIG. 7 is a schematic diagram that shows the presentation of an immersive 3D display in accordance with some embodiments.

FIG. 7 is a schematic diagram 700 that shows the presentation of an immersive 3D display in accordance with some embodiments. An immersive 3D display 702 configured as an advertisement for the movie 'Terminator' is transmitted to the user device 710. Accordingly, the interactive content on the interactive content panels 712, 714, 716 and 718 can be related to the movie. For example, the interactive content can include a photo gallery with stills from the movie, a video clip of the movie trailer, social networking links to share permitted content and the like. The icon 720 indicates to the user to swipe the display 702 or otherwise actuate the device 710 to access further content lying out of the device screen area. The icon 720 may not be visible in some embodiments. The immersive 3D display 702 can be configured as an advertisement 704 incorporated into the webpage 708 in some embodiments. A user's tap gesture or other input selecting the advertisement 704 can enable unfolding the advertisement 704 to provide the immersive 3D display 702. In some embodiments, the immersive 3D display 702 can be provided in a standalone app as shown at 706.

Figure 8:
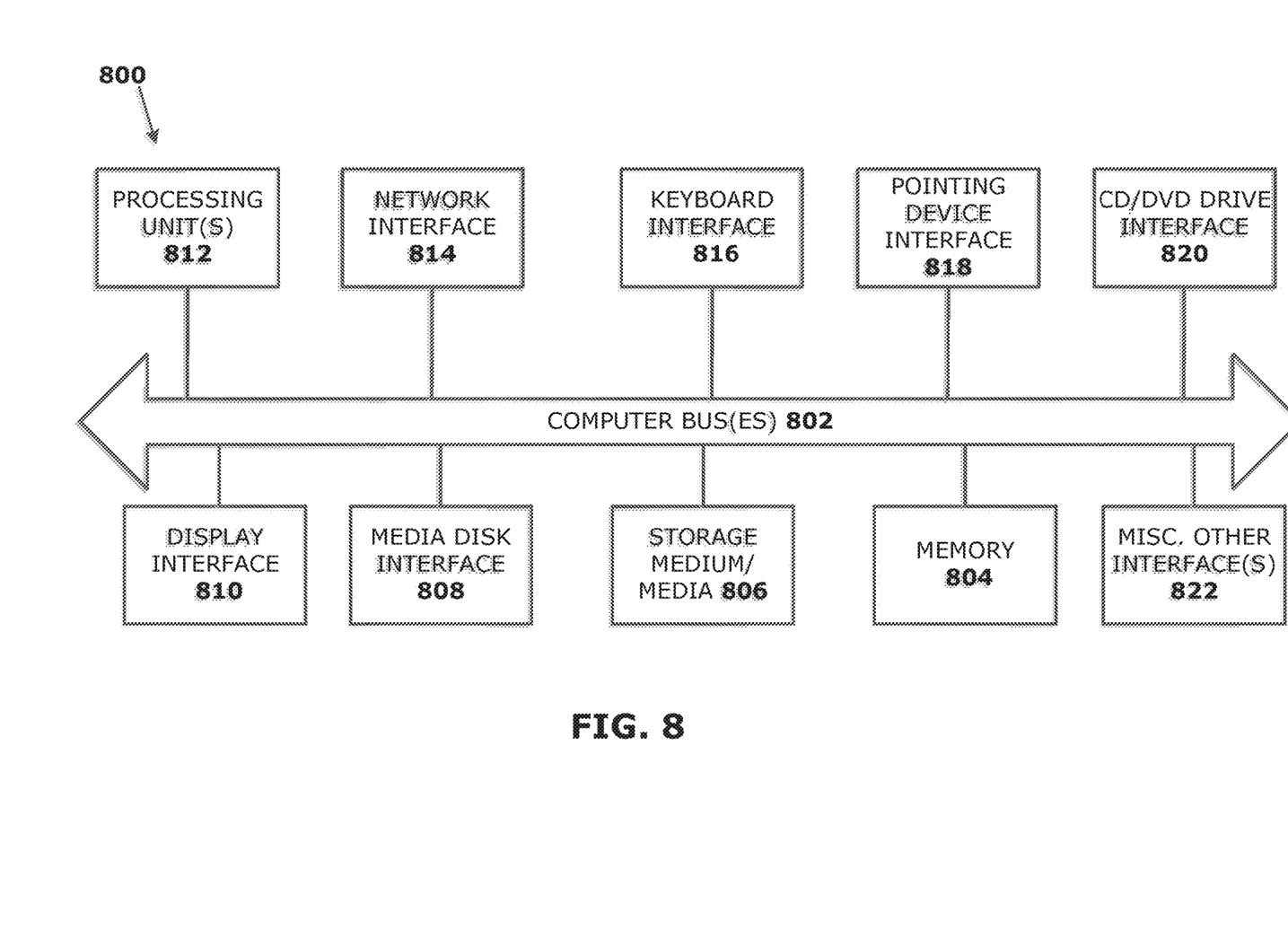
FIG. 8 is an example of the internal architecture of a particular computing device that can store and/or execute the various modules for generating immersive 3D displays in accordance with embodiments described herein.

FIG. 8 is an example of the internal architecture of a particular computing device 800 that can store and/or execute the various modules for generating immersive 3D displays in accordance with embodiments described herein. For example, the computing device 500 can be configured to receive the assets and to generate the immersive 3D displays in accordance with embodiments described herein. The computing device 800 includes one or more processing units 812, which interface with at least one computer bus 802. In some embodiments, the processing units can comprise one or more of general purpose processors such as Central Processing Units (CPUs) and Graphics Processing Units (GPUs). Also interfacing with computer bus 802 are persistent storage medium/media 806, network interface 814, memory 804, e.g., random access memory (RAM), run-time transient memory, read only memory (ROM), etc., media disk drive interface 808, an interface 820 for a drive that can read and/or write to media including removable media such as floppy, CD-ROM, DVD, etc., media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code or logic, and/or computer-executable process steps, incorporating functionality described herein, e.g., one or more of process flows described herein. CPU 812 first loads computer-executable process steps or logic from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, metadata, playlists and other files. Persistent storage medium/media 806 can further include program modules and data files used to implement one or more embodiments of the present disclosure.

Figure 9:
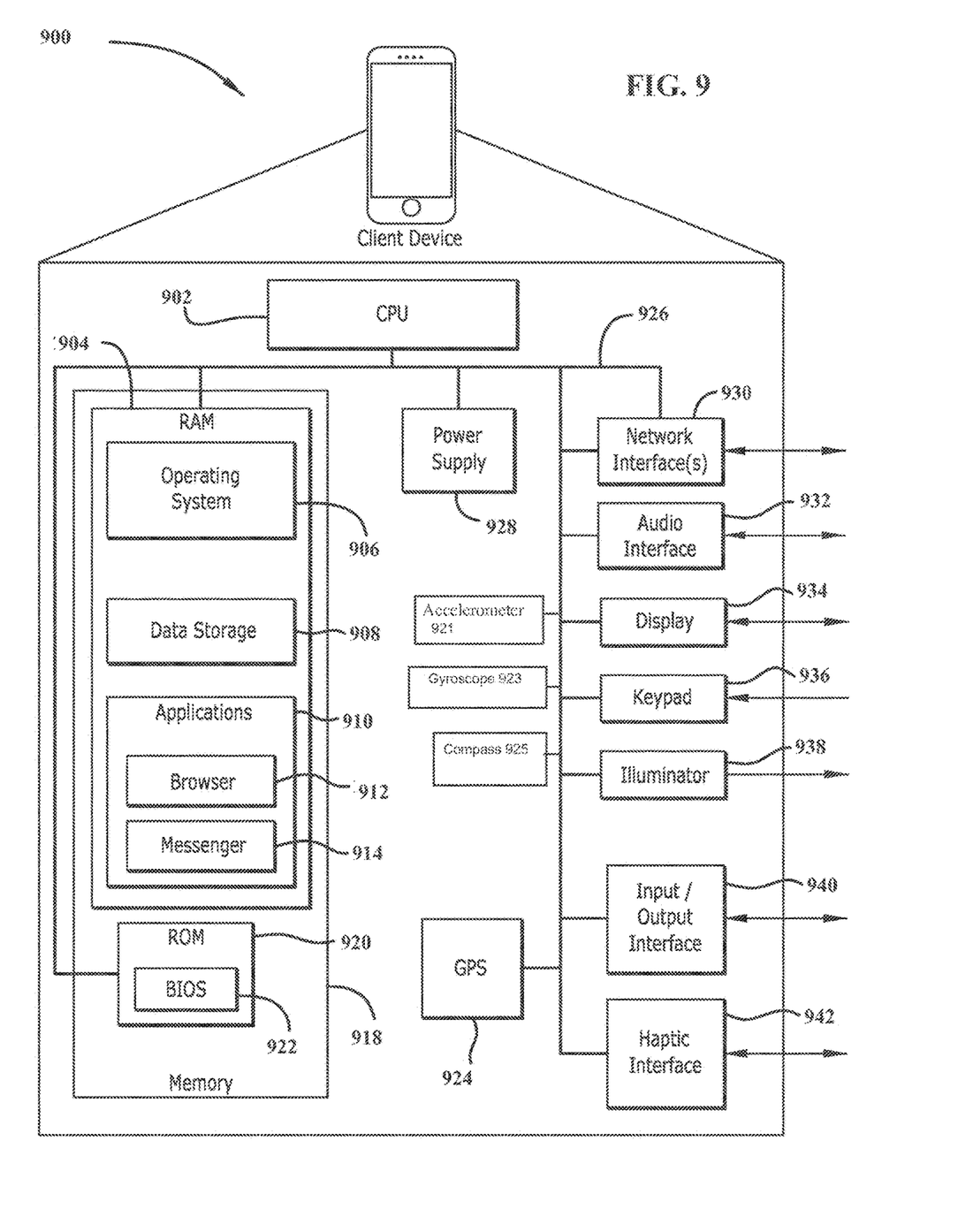
FIG. 9 is a schematic diagram illustrating a client device implementation of a computing device in accordance with embodiments of the present disclosure.

FIG. 9 is a schematic diagram illustrating a client device implementation of a computing device in accordance with embodiments of the present disclosure. For example, a client device 900 can comprise an immersive 3D display in accordance with embodiments described herein. When the client device 900 is connected to a server, an immersive 3D display in accordance with embodiments described herein can be downloaded and displayed to the user via a mobile web browser. The client device 900 may include a computing device capable of sending or receiving signals, such as via a wired or a wireless network, and capable of running application software or "apps" 910 which in turn can have a user interface. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 902, power supply 928, a memory 918, ROM 920, BIOS 922, network interface(s) 930, audio interface 932, display 934, keypad 936, illuminator 938, I/O interface 940 interconnected via circuitry 926. Claimed subject matter is intended to cover a wide range of potential variations. For example, the keypad 936 of a cell phone may include a numeric keypad or a display 934 of limited functionality, such as a monochrome liquid crystal display (LCD) for displaying text. In contrast, however, as another example, a web-enabled client device 900 may include one or more physical or virtual keyboards 936, mass storage, one or more accelerometers 921, one or more gyroscopes 923, a compass 925, global positioning system (GPS) 924 or other location identifying type capability, Haptic interface 942, or a display with a high degree of functionality, such as a touch-sensitive color 2D or 3D display, for example. The memory 918 can include Random Access Memory 904 including an area for data storage 908. The client device 900 can also comprise a camera 927 or other optical and/or thermal sensors.

A client device 900 may include or may execute a variety of operating systems 906, including a personal computer operating system, such as a Windows, iOS or Linux, or a mobile operating system, such as iOS, Android, or Windows Mobile, or the like. A client device 900 may include or may execute a variety of possible applications 910, such as a client software application 914 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 900 may also include or execute an application to communicate content, such as, for example, textual content, multimedia content, or the like. A client device 900 may also include or execute an application to perform a variety of possible tasks, such as browsing 912, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more additional mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include submodules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

A computer program listing appendix of the present disclosure includes TABLE I showing a non-limiting example of source code for generating the immersive 3D display for an online advertisement unit from a cubic-shaped volume having interactive content panels in accordance with an embodiment, and TABLE II showing a non-limiting example of source code for manipulation of the immersive 3D display in response to displacement of the client device in accordance with some embodiments.

What is claimed is:

1. A method comprising:
    displaying an immersive display on a display of a computing device, by a processor of the computing device, the immersive display comprising a background panoramic image spherically mapped to a virtual 3D geometric structure in a virtual 3D space of the immersive display, the virtual 3D geometric structure comprising sides, each side being visible in the immersive display;
    displaying, by the processor, at least one visible interactive content layer at a position in front of the background panoramic image within the virtual 3D space of the immersive display;
    displaying, by the processor, interactive content panels of the interactive content layer, each of the interactive content panels included in a respective side of the virtual 3D geometric structure; and
    conforming, by the processor, the background panoramic image to the 3D geometric structure, the background panoramic image being visible through a number of the interactive panels of the interactive content layer.

2. The method of claim 1, further comprising:
    receiving, by the processor, an input indicative of a user interaction with the device; and
    manipulating, by the processor, the immersive display in response to the input.

3. The method of claim 2, manipulating the immersive displaying comprising causing a portion of the background panoramic image out of view prior to the input to be visible in the immersible display in response to the input.

4. The method of claim 2, the display of the computing device is a touchscreen and the input comprises a swipe of the touchscreen by a user of the computing device.

5. The method of claim 2, the computing device is a mobile computing device and the input comprising input from a motion sensor in the mobile computing device.

6. The method of claim 5, the motion sensor input is indicative of an angular movement of the mobile computing device.

7. The method of claim 1, further comprising:
    displaying, by the processor, an interactive video player on one of the interactive content panels included in a respective side of the virtual 3D geometric structure.

8. The method of claim 1, the panoramic background image and interactive content displayed on each of the interactive content panels being associated with a common theme.

9. The method of claim 1, further comprising:
    receiving, by the processor, user input in connection with two-dimensional (2D) content displayed in the display of the computing device; and
    displaying, by the processor, the immersive display on the display of the computing device in response to user input.

10. The method of claim 1, at least one side of the virtual 3D geometric structure comprising a plurality of interactive content panels.

11. The method of claim 10, the background panoramic image being visible through each of the plurality of interactive content panels of the at least one side of the virtual 3D geometric structure.

12. The method of claim 1, the sides of the 3D structure configured as a rectangular prism.

13. A non-transitory computer-readable storage medium tangibly encoded with computer-executable instructions that when executed by a processor associated with a computing device perform:
    displaying an immersive display on a display of a computing device, the immersive display comprising a background panoramic image spherically mapped to a virtual 3D geometric structure in a virtual 3D space of the immersive display, the virtual 3D geometric structure comprising sides, each side being visible in the immersive display;
    displaying at least one visible interactive content layer at a position in front of the background panoramic image within the virtual 3D space of the immersive display;
    displaying interactive content panels of the interactive content layer, each of the interactive content panels included in a respective side of the virtual 3D geometric structure; and
    conforming the background panoramic image to the 3D geometric structure, the background panoramic image being visible through a number of the interactive panels of the interactive content layer.

14. The non-transitory computer-readable storage medium of claim 13, the method further comprising instructions for:
receiving an input indicative of a user interaction with the device; and
manipulating the immersive display in response to the input.

15. The non-transitory computer-readable storage medium of claim 14, the manipulating of the immersive display comprising causing a portion of the background panoramic image out of view prior to the input to be visible in the immersible display in response to the input.

16. The non-transitory computer-readable storage medium of claim 13, further comprising instructions for:
displaying an interactive video player on one of the interactive content panels included in a respective side of the virtual 3D geometric structure.

17. The non-transitory computer-readable storage medium of claim 13, further comprising instructions for:
receiving user input in connection with two-dimensional (2D) content displayed in the display of the computing device; and
displaying the immersive display on the display of the computing device in response to user input.

18. The non-transitory computer-readable storage medium of claim 13, at least one side of the virtual 3D geometric structure comprising a plurality of interactive content panels.

19. The non-transitory computer-readable storage medium of claim 13, the background panoramic image being visible through each of the plurality of interactive content panels of the at least one side of the virtual 3D geometric structure.

20. A computing device comprising:
a processor;
a non-transitory storage medium for tangibly storing thereon program logic for execution by the processor, the program logic comprising:
displaying logic executed by the processor for displaying an immersive display on a display of a computing device, by a processor of the computing device, the immersive display comprising a background panoramic image spherically mapped to a virtual 3D geometric structure in a virtual 3D space of the immersive display, the virtual 3D geometric structure comprising sides, each side being visible in the immersive display;
displaying logic executed by the processor for displaying at least one visible interactive content layer at a position in front of the background panoramic image within the virtual 3D space of the immersive display;
displaying logic executed by the processor for displaying interactive content panels of the interactive content layer, each of the interactive content panels included in a respective side of the virtual 3D geometric structure; and
conforming logic executed by the processor for conforming the background panoramic image to the 3D geometric structure, the background panoramic image being visible through a number of the interactive panels of the interactive content layer.

* * * * *